(12) United States Patent
Shapiro et al.

(10) Patent No.: US 11,538,069 B1
(45) Date of Patent: *Dec. 27, 2022

(54) PRESENTING CONTENT ITEMS ASSOCIATED WITH DYNAMICALLY-CREATED ADVERTISEMENTS TO USERS OF A SOCIAL NETWORKING SYSTEM

(71) Applicant: Meta Platforms, Inc., Menlo Park, CA (US)

(72) Inventors: Scott Aaron Shapiro, San Francisco, CA (US); Shreehari Manikarnika, San Francisco, CA (US); Brian M. Wrightson, Oakland, CA (US); Saket Jalan, Mountain View, CA (US); Gang Wu, Millbrae, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/563,777

(22) Filed: Sep. 6, 2019

Related U.S. Application Data

(63) Continuation of application No. 14/085,988, filed on Nov. 21, 2013, now Pat. No. 10,445,785.

(51) Int. Cl.
G06Q 30/00 (2012.01)
G06Q 30/02 (2012.01)
G06Q 50/00 (2012.01)

(52) U.S. Cl.
CPC ..... G06Q 30/0271 (2013.01); G06Q 30/0255 (2013.01); G06Q 30/0276 (2013.01); G06Q 50/01 (2013.01)

(58) Field of Classification Search
None
See application file for complete search history.

(56) References Cited

U.S. PATENT DOCUMENTS

| | | | | |
|---|---|---|---|---|
| 6,119,101 A | * | 9/2000 | Peckover | G06Q 30/02 705/14.17 |
| 2002/0107737 A1 | * | 8/2002 | Kaneko | G06Q 30/0272 705/14.68 |

(Continued)

*Primary Examiner* — Michael W Schmucker
(74) *Attorney, Agent, or Firm* — BakerHostetler

(57) ABSTRACT

A social networking system associates identification information with combinations of values used to generate a dynamically-created advertisement. Interactions with the dynamically-created advertisement by social networking system users are also associated with the dynamically-created advertisement. The social networking system uses the identification information to present the same combination of values used to generate the dynamically-created advertisement to additional social networking system users. Additionally, information describing interactions with the dynamically-created advertisement is determined from the interactions associated with the identification information, allowing the dynamically-created advertisement to be included in a personalized feed of content items presented to an additional user along with information describing interactions by various users presented with the same combination of values of components in the dynamically-created advertisement.

20 Claims, 2 Drawing Sheets

(56) References Cited

U.S. PATENT DOCUMENTS

| | | |
|---|---|---|
| 2007/0208610 A1* | 9/2007 | Pisaris-Henderson ........................ G06Q 40/00 705/14.1 |
| 2010/0132049 A1 | 5/2010 | Vernal et al. |
| 2010/0332330 A1 | 12/2010 | Goel et al. |
| 2011/0106631 A1 | 5/2011 | Lieberman et al. |
| 2011/0153421 A1* | 6/2011 | Novikov ............ G06Q 30/0254 705/14.52 |
| 2013/0030901 A1* | 1/2013 | Eichstaedt ......... G06Q 30/0217 705/14.26 |
| 2013/0036013 A1 | 2/2013 | James et al. |
| 2013/0060634 A1* | 3/2013 | Corson .................. G06Q 30/02 705/14.58 |
| 2015/0106183 A1 | 4/2015 | McEvilly et al. |

\* cited by examiner

PRESENTING CONTENT ITEMS ASSOCIATED WITH DYNAMICALLY-CREATED ADVERTISEMENTS TO USERS OF A SOCIAL NETWORKING SYSTEM

CROSS REFERENCE TO RELATED APPLICATIONS

This application is a continuation of co-pending U.S. application Ser. No. 14/085,988, filed Nov. 21, 2013, which is incorporated by reference in its entirety.

BACKGROUND

This disclosure relates generally to social networking systems, and in particular to presenting content items associated with advertisements to users of a social networking system.

A social networking system allows its users to connect to and communicate with other social networking system users. Users may create profiles on a social networking system that are tied to their identities and include information about the users, such as interests and demographic information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users.

Presenting advertisements to users of a social networking system allows an advertiser to gain public attention for products or services or to persuade social networking system users to take an action regarding the advertiser's products or services. Many social networking systems generate revenue by displaying advertisements to their users. Frequently, social networking systems charge advertisers for each presentation of an advertisement to a social networking system user (e.g., each "impression" of the advertisement) or interaction with an advertisement by a social networking system user.

Conventional social networking systems receive multiple advertisements from advertisers or other entities and select advertisements for presentation from various advertisements received from different advertisers. However, this requires advertisers to provide information describing a large number of advertisements and the SNS to allocate resources to determining whether a large number of advertisements comply with SNS advertisement policies. In these conventional social networking systems, an advertiser expends significant resources generating multiple advertisements for potential presentation to SNS users, and the SNS also expends significant resources evaluating a large number of advertisements received from different advertisers.

SUMMARY

To allow advertisers to more accurately tailor advertisements to users of a social networking system and to simplify selection of advertisements, a social networking system receives an advertisement template from an advertiser that includes placeholder or default values for one or more components of the advertisement template. For example, an advertisement template includes placeholder values for one or more of a title, a body, an image, or a description of an advertisement. An identifier is associated with the advertisement template to allow subsequent retrieval of the advertisement template. An advertisement generated based on values of components of an advertisement template (a "dynamically-created advertisement") may include several components with a large variety of values for each component (e.g., language, font size, font color, background color, etc.).

When the social networking system identifies an opportunity to present an advertisement to a user, the social networking system provides information describing the user to an advertiser, which communicates information identifying the advertisement template (e.g., the identifier associated with the advertisement template), a bid amount, and values for one or more components of the advertisement template to the social networking system. Alternatively, the social networking system provides information describing the user to a demand service provider, which provides the social networking system with information identifying the advertisement template, the bid amount, and vales for one or more components of the advertisement template. If the advertisement is selected for presentation, the placeholder values in the advertisement template are replaced by the values received from the advertiser and an advertisement is presented to the user including the values received from the advertiser. This allows the social networking system to provide dynamically-created advertisements to its users, which include combinations of components that optimally selected for presentation to various users based on an advertisement template, rather than selecting from various advertisements individually specifying different combinations of components. This reduces the amount of time and resources used by an advertiser to create advertisements and used by the SNS to select advertisements for presentation to users.

However, dynamically-created advertisements generated from an advertisement template may include different components. For example, based on a single advertisement template, the social networking system may present a user who has recently viewed motorcycle jackets from an online motorcycle supply store with an advertisement for similar jackets, and an additional user who has recently viewed motorcycle helmets on the same supplier's website with advertisements for similar helmets. Both of these advertisements may be associated with information identifying a single advertisement template including placeholder components that are replaced by content identified by an advertiser when the advertisement template is selected for presentation to the different users in the preceding example. Generating identifying information associated with different combinations of values of components for an advertisement template allows user-generated content items associated with an advertisement generated from an advertisement template to be presented with the relevant advertisement. For example, a story describing a user's interaction with an advertisement generated from an advertisement template is presented to other social networking system users along with the specific advertisement with which the user interacted.

A content item relating to an advertisement generated from an advertisement template is associated with identifying information associated with a combination of values of components for the advertisement template used to generate the advertisement. For example, if a user shares an advertisement with another user, expresses a preference for the advertisement (i.e., "likes" the advertisement), or comments on the advertisement, a story identifying the advertisement and the user's interaction with the advertisement is generated and presented to additional users connected to the user. The generated story is also associated with an identifier for the combination of values of components for the advertisement template used to generate the advertisement, allowing the story to reflect the values of components used in the specific advertisement with which the story is associated, rather than other advertisements based on the same advertisement template. Interactions of additional users with the advertisement or with a content item related to the advertisement are also associated with the identifier for the values of components used to generate the advertisement. Various content items related to a dynamically-created advertisement may be presented to a user along with other content items. For example, content items associated with a dynamically-created advertisement and also associated with users connected to a viewing user are presented to the viewing user. In some implementations, the social networking system assigns identification information to a dynamically-created advertisement after an interaction with the advertisement that leads to the creation of a content item occurs.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
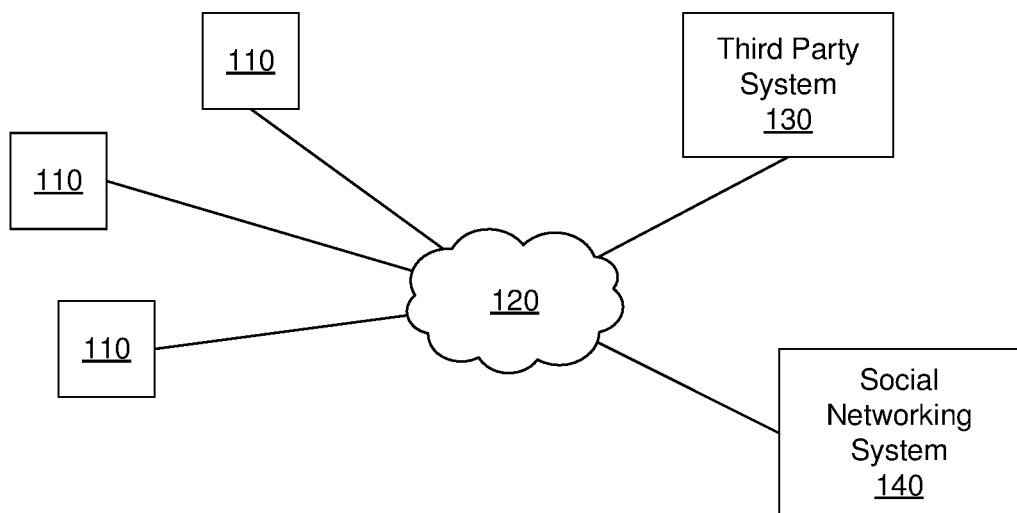
FIG. 1 is a block diagram of a system environment in which a social networking system operates, in accordance with an embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
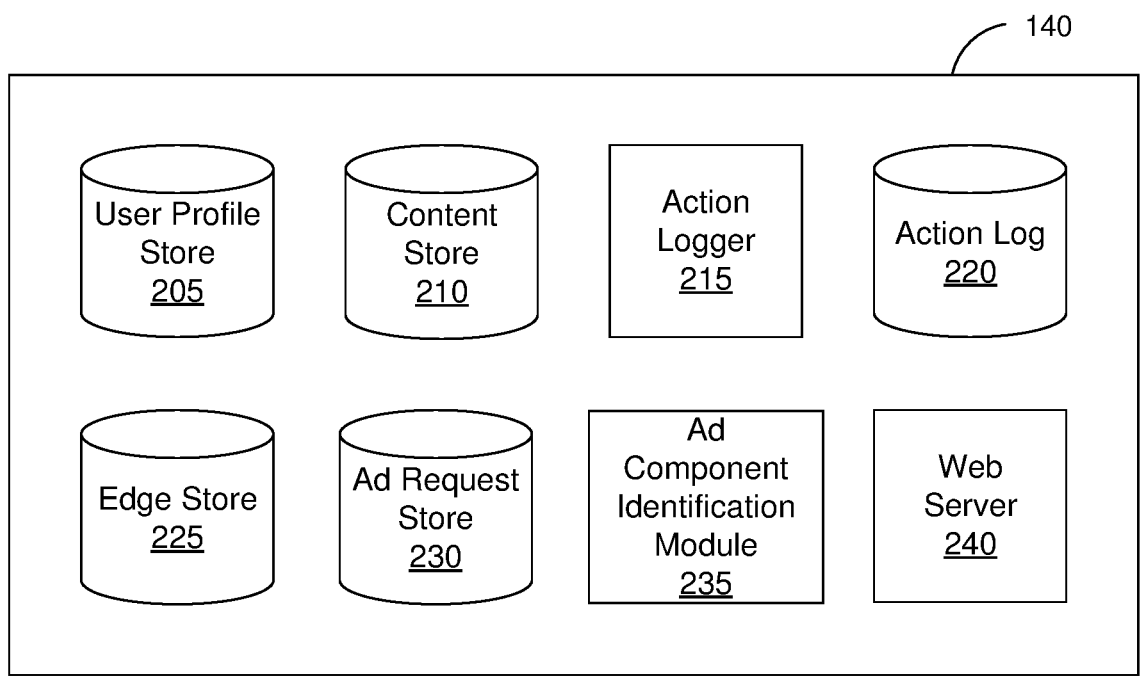
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, an advertisement ("ad") request store 230, an advertisement ("ad") association module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a cookie synchronization process that enables the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are stored in the ad request store 230. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the social networking system 140 if the advertisement is presented to a user or accessed by a user. In one embodiment, the bid amount is used by the social networking system 140 to determine an expected value, such as monetary compensation, received by the social networking system 140 for presenting the advertisement to a user, if the advertisement receives a user interaction, or based on any other suitable condition. For example, the bid amount specifies a monetary amount that the social networking system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. The targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

In various embodiments, the ad request store 230 includes one or more advertisement templates including various components of advertisements. One or more of the advertisement templates include placeholder or default values for one or more components. For example, an advertisement template includes placeholder values for one or more of a title, a body, an image, or a description of an advertisement. An identifier is associated with the advertisement template to allow subsequent retrieval of the advertisement template. By identifying an advertisement template and values of components of an advertisement template, an advertiser may generate an advertisement (a "dynamically-created advertisement") customized to a user. Hence, an advertiser may generate dynamically-created advertisements customized for various users by changing values associated with components of an advertisement template (e.g., language, font size, font color, background color, etc.).

The ad association module 235 identifies unique combinations of values of components of a dynamically-created advertisement. For a combination of advertisement components from which a dynamically-created advertisement was created to be unique, the value of at least one component is different from components of other dynamically-created advertisements presented to additional users of the SNS. Example components of an advertisement may include: a title, body, image, description, and destination address; however other suitable components may be included in an advertisement. In some implementations, additional components (e.g., video data, audio data) may be included in an advertisement. In some embodiments, the ad association module 235 applies one or more rules to identify unique combinations of values of advertisement components. For example, if an advertisement for a website includes a special price generated for that user to make the advertisement more personalized, the advertisement is not identified as unique if the advertisement that is identical in all respects to an advertisement presented to an additional social networking system 140 other than the special price presented in the different advertisements.

Additionally, the ad association module 235 associates a unique identifier with each unique combination of values of components used to generate a dynamically-created advertisement. Because a dynamically-created advertisement is generated based on values specified for components of an identified advertisement template, the ad association module 235 associates a unique identifier with the combination of values used to generate the dynamically-created advertisement rather than the identified advertisement template to allow retrieval of the specific combination of values used to create the dynamically-created advertisement. For example, a unique identifier, such as an identification number, may be assigned to each unique combination of values of components from which a dynamically-created advertisement was created. Alternatively, a combination of identifying information may be used to identify a unique combination of values of components from which a dynamically-created advertisement was created. For example, a combination of identifiers for a title, image, description, and advertisement template may be used to identify a unique combination of values of components from which a dynamically-created advertisement was created. If a combination of values of components from which a dynamically-created advertisement was created was previously used to create an additional dynamically-created advertisement, the combination of values is associated with an identifier generated when the additional advertisement was generated.

An identifier associated with a combination of values of components of an advertisement template is also associated with content items that are associated with a dynamically-created advertisement generated from the combination of values of components of the advertisement template. In one embodiment, when a social networking system user interacts with a dynamically-created advertisement, a content item is created describing the interaction, and the content item may be presented to additional social networking system users. For example, if a user comments on an advertisement, a story is created that identifies the advertisement, identifies the user, and describes the action taken by the user. The story may be presented to additional users of the social networking system 140 that are connected to the user via the social networking system 140. For example, the story is included in a newsfeed presented to a social networking system user that describes actions performed by other social networking system users connected to the social networking system user. Associating an identifier describing a combination of values of components of an advertisement template used to generate a dynamically-created advertisement allows retrieval of the combination of values of components associated with the dynamically-created advertisement, for presentation to additional social networking system users along with additional content, as further described below in conjunction with FIG. 3.

The web server 245 links the social networking system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or BlackberryOS.

Presenting Content Items about Dynamically-Created Advertisements

Figure 3:
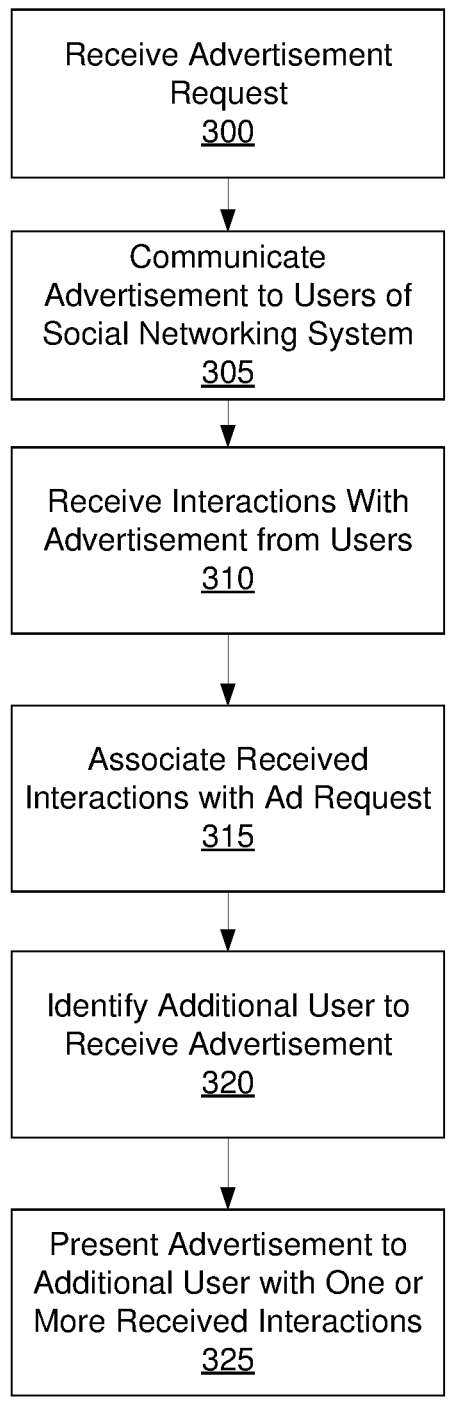
FIG. 3 is a flow chart of a method for presenting content items relating to user interactions with a dynamically-created advertisement, in accordance with an embodiment.

FIG. 3 is a flow chart of one embodiment of a method for presenting content items relating to user interactions with a dynamically-created advertisement with the corresponding advertisement. The social networking system 140 receives 300 an advertisement ("ad") request from an advertiser including information describing an advertisement. In one embodiment, the ad request identifies an advertisement template including a plurality of components for generating the advertisement. One or more components in the advertisement template identified by the ad request may be associated with default or placeholder values. For example, an advertisement template includes placeholder values for one or more of a title, a body, an image, and a description of an advertisement. An identifier is associated with the advertisement template to allow subsequent retrieval of the advertisement template by the social networking system 140 and/or the advertiser.

In one embodiment, after the ad request is stored by the social networking system 140, when the social networking system 140 identifies an opportunity to present the advertisement to one or more users, the social networking system 140 sends a request for a bid to an advertiser or demand side platform (DSP). For example, the request includes information describing one or more characteristics of a social networking system user eligible to be presented with the advertisement. In response to the request, the advertiser or DSP communicates a bid to the social networking system 140 that includes information identifying an advertisement template (e.g., the identifier associated with the advertisement template), a bid amount, and values for one or more components of the advertisement template. In one embodiment, the social networking system 140 ranks bids received from various advertisers or DSPs based on bid amounts included in the received bids. Using the ranking, a bid is selected and an advertisement associated with the selected bid is retrieved for presentation to the user. An advertisement template associated with the selected bid is retrieved. For example, a bid having a highest bid amount is selected and the advertisement template associated with the selected bid is identified.

Based on the selected bid and the advertisement template identified by the selected bid, an advertisement is generated. One or more values of components of the identified ad template are retrieved from the bid and associated with components included in the identified advertisement template. For example, values from the selected bid are associated with components in the identified ad template associated with placeholder or default values. Hence, the social networking system 140 provides an advertisement including content dynamically-selected for a user when an opportunity to present the advertisement is identified based on a bid received from an advertiser or from a DSP.

An identifier is associated with the combination of values of components of the advertisement template used to generate the advertisement from the selected bid. For example, an identifier, such as an identification number, is associated with the combination of values of components of the advertisement template. Alternatively, a combination of identifiers associated with values for different components from the advertisement template is associated with the advertisement generated from the values associated with the components of the advertisement template. For example, a combination of identifiers of values for a title component, an image component, a description component, and an advertisement template are associated with an advertisement generated from the values of the components in the advertisement template. In one embodiment, the identifier is associated with a combination of values for components of an advertisement template after a social networking system user interacts with the advertisement generated based on the advertisement template and combination of values for components. For example, an identifier is not associated with a combination of values for components of an advertisement template until a content item describing an interaction with an advertisement generated from the combination of values for components of an advertisement template is generated.

The received combination of values of components of an advertisement template may be compared to combinations of values of components for advertisement templates used to generate advertisements previously presented to one or more social networking system users. If the received combination of values of components of the advertisement template matches a combination of values of components of the advertisement template used to generate an advertisement previously presented to one or more social networking system users, the received combination of values of components of the advertisement template is associated with an identifier associated with the combination of values of the advertisement template used to generate the previously presented advertisement.

However, a new identifier is associated with the received combination of values of components of the advertisement template if a received value of at least one component differs from values of components of the advertisement template used to generate an advertisement previously presented to one or more social networking system users. Similarly, a new identifier is associated with the received combination of values of components of the advertisement template if the received combination of values includes values for a different number of components than previously received combinations of values of the advertisement template from which advertisements were generated. For example, if a received combination of values for components of an advertisement template differs from a previously-received combination of values for the advertisement template from which an advertisement was generated, a new identifier is associated with the received combination of values for components of the advertisement template. In one embodiment, a new identifier is associated with a received combination of values of components of an advertisement template that generates an advertisement presenting components of the advertisement template in a different arrangement than in an advertisement generated from the advertisement template that was previously presented to one or more social networking system users.

In some embodiments, one or more rules are applied to the received combination of values for an advertisement template to determine if the received combination of values for components differs from combinations of values of components for the advertisement template from which an advertisement was previously generated and presented to one or more social networking system users. For example, the title of an advertisement may include a special price to grab the user's attention, so a received combination of values of components of an advertisement template that only differs from a combination of values of components of the advertisement template used to generate an advertisement previously presented to a social networking system user including a different price in the title is not identified as different from the combination of values of components of the advertisement template used to generate the previously presented advertisement. Rather, the received combination of values of components of the advertisement template is associated with an identifier associated with the combination of values of components of the advertisement template used to generate the previously presented advertisement.

The advertisement generated from the values of components of an advertisement template (the "dynamically-created advertisement") is communicated 305 by the social networking system 140 to one or more client devices for presentation to one or more users of the social networking system 140. For example, the advertisement generated from the combination of values of components of the advertisement template is included in feeds presented to various users of the social networking system 140 that include a plurality of stories describing actions performed by social networking system users. A feed is personalized for a user presented with the feed to include stories describing actions associated with objects (e.g., pages, groups, events, etc.) maintained by the social networking system 140 to which the user is connected or to which the user has at least a threshold affinity and/or actions associated with additional users connected to the user via the social networking system 140.

The social networking system 140 receives 310 interactions with the advertisement from social networking system users 310 presented with the generated advertisement. For example, if a user of the social networking system expresses a preference for the advertisement (i.e., "likes" the advertisement) or comments on the advertisement, the social networking system 140 generates a story describing the user's interaction with the advertisement. The social networking system 140 associates 315 the received interactions with the identifier associated with the combination of values of the advertisement template used to generate the advertisement.

After associating 315 one or more received interactions with the identifier, the social networking system 140 identifies 320 an additional user to receive the dynamically-created advertisement 320 created from the received combination of values for components of an advertisement template. For example, the additional user is identified 320 as a user having one or more characteristics (e.g., connections to other users or objects, demographic information, actions) that satisfy one or more targeting criteria included in the ad request. When the additional user to be presented with the advertisement is identified, interactions associated with the combination of values of the advertisement template used to generate the advertisement are retrieved.

The advertisement is presented 325 to the additional user along with information describing one or more interactions associated with the combination of values of the advertisement template used to generate the advertisement. In one embodiment, the advertisement is presented 325 in a feed of content personalized for the additional user along with additional content items personalized for presentation to the additional user. For example, a feed personalized for the additional user includes content items describing interactions associated with objects and/or additional users connected to the additional user via the social networking system 140 (e.g., stories associated with users connected to the additional user). To personalize the feed for the additional user, content items included in the feed are selected as content items associated with objects (e.g., pages, events, groups, etc.) to which the user is connected or has at least a threshold affinity or content items associated with users of the social networking system 140 to which the additional user is connected via the social networking system 140.

In one embodiment, the advertisement is presented 325 along with information describing at least one interaction associated with the combination of values for components of the advertisement template used to generate the advertisement that was received from one or more users of the social networking system 140 not connected to the additional user through the social networking system 140. For example, the advertisement is presented 325 along with information describing interactions with the advertisement generated from the received combination of values for components of the advertisement template that were received from all users of the social networking system 140 that interacted with the advertisement. This allows the advertisement to be presented 325 to the additional user along with information describing global interaction with the advertisement by social networking system users, even those not connected to the additional user. In one embodiment, the advertisement is presented 325 with information describing aggregated interactions with the advertisement by social networking system users previously presented with the advertisement. For example, an indication of a total number of users that expressed a preference for the advertisement or an indication of a total number of users that commented on the advertisement is presented 325 to the additional user along with the advertisement. If the additional user interacts with the advertisement presented 325 in the feed of content items personalized for the additional user, and the interaction is associated with the combination of values for components of the advertisement template used to generate the advertisement and stored, allowing subsequent presentation of the advertisement to other users to include content describing the additional user's interaction with the advertisement; further, the additional user's interaction with the advertisement may be used to identify other users connected to the additional user to be presented with the advertisement in feeds personalized for presentation to the other users.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
receiving, from a third party system, an advertisement request for an advertisement for presentation to a plurality of users of an online system, the advertisement including an advertisement template that includes placeholder components that are replaced with two or more advertising components of a plurality of different possible advertisement components upon being presented to the plurality of users of the online system;
for the plurality of users:
responsive to identifying an opportunity to present an advertisement to a user, providing, by the online system, information describing the user to the third party system;
receiving, from the third party system, information identifying a first advertising component and at least one second advertisement component of the plurality of different possible advertisement components to be presented to the user with the advertisement, where the first advertising component and the at least one second advertisement component of the advertisement for the user include at least one different from one or more of the advertisement components of the advertisement presented to another user of the plurality of users;
responsive to the advertisement being selected in a selection process, replacing the placeholder components in the advertisement template with the first advertising component and the at least one second advertisement component to generate the advertisement for the user;
generating a unique identifier for a combination of the first advertising component and the at least one second advertisement component, the unique identifier representing a unique combination of the plurality of different possible advertisement components of the generated advertisement;
generating, based on the unique combination of the plurality of different possible advertisement components, at least one feed personalized for the user, wherein the feed comprises one or more stories indicating actions performed by at least one user of the online system; and
communicating the generated advertisement in the feed for presentation, by a client device, to the user.

2. The method of claim 1, wherein the first advertising component or the at least one second advertisement component of the plurality of different possible advertisement components represents one or more products offered for sale by the third party system.

3. The method of claim 1, wherein the first advertising component and the at least one second advertisement component are selected from a group consisting of: a title, a body, a description, a destination address, an image, video data, or any combination thereof.

4. The method of claim 1, wherein the unique combination of the plurality of different possible advertisement components is transmitted to the additional user with information describing aggregated interactions received from users of the plurality of users.

5. The method of claim 4, wherein the unique identifier is a combination of values of the first advertising component and the at least one second advertisement component.

6. The method of claim 4, further comprising:
for the unique combination of the plurality of different possible advertisement components previously communicated in the advertisement to a user of the plurality of users:
receiving a plurality of comments associated with the unique combination for advertisement, the plurality of comments being submitted by one or more users to whom the advertisement with the unique combination was communicated; and
associating the plurality of comments with the unique identifier for the unique combination.

7. The method of claim 6, further comprising:
identifying an additional user of the plurality of users of the online system to be presented with a unique combination previously communicated in the advertisement; and
transmitting, to the additional user of the online system, the unique combination of the advertisement, the unique combination previously communicated in the advertisement including at least one comment of the plurality of received comments associated with the unique combination previously communicated in the advertisement via the unique identifier for the unique combination previously communicated in the advertisement, and the at least one comment including an identification of the user that performed the at least one comment.

8. The method of claim 7, further comprising:
receiving an interaction with the advertisement from the additional user; and
associating the received interaction from the additional user with the unique identifier for the unique combination.

9. The method of claim 1, further comprising generating another personalized feed for presentation to another user.

10. A non-transitory computer-readable storage medium comprising instructions that,
when executed by a processor, cause the processor to:
receive, from a third party system, an advertisement request for an advertisement for presentation to each of a plurality of users of an online system, the advertisement including an advertisement template that includes placeholder components that are replaced with two or more advertising components of a plurality of different possible advertisement components upon being presented to each of the plurality of users of the online system;
for the plurality of users:
provide, by the online system, information describing a user to the third party system;
receive, from the third party system, information identifying a first advertising component and at least one second advertisement component of the plurality of different possible advertisement components to be presented to the user with the advertisement, where the first advertising component and the at least one second advertisement component of the advertisement for the user include at least one different from one or more of the advertisement components of the advertisement presented to another user of the plurality of users;
replace the placeholder components in the advertisement template with the first advertising component and the at least one second advertisement component to generate an advertisement for the user;
generate a unique identifier for a combination of the first advertising component and the at least one second advertisement component, the unique identifier representing a unique combination of the plurality of different possible advertisement components of the generated advertisement;
generate, based on the unique combination of the plurality of different possible advertisement components, at least one feed personalized for the user, wherein the feed comprises one or more stories indicating actions performed by at least one user of the online system; and
communicate the generated advertisement for presentation, by a client device, to the user in a feed personalized for the user.

11. The non-transitory computer-readable storage medium of claim 10, wherein the information describing the user to the third party system is provided by the online system in response to identifying an opportunity to present the advertisement to the user.

12. The non-transitory computer-readable storage medium of claim 10, wherein the placeholder components in the advertisement template are replaced with the first advertising component and the at least one second advertisement component to generate the advertisement for the user in response to the advertisement being selected in a selection process.

13. The non-transitory computer-readable storage medium of claim 10, wherein the advertising component of the plurality of different possible advertisement components represents one or more products offered for sale by the third party system.

14. The non-transitory computer-readable storage medium of claim 10, wherein the first advertising component and the at least one second advertisement component are selected from a group consisting of: a title, a body, a description, a destination address, an image, video data, or any combination thereof.

15. The non-transitory computer-readable storage medium of claim 10, wherein the unique combination of the plurality of different possible advertisement components is transmitted to the additional user with information describing aggregated interactions received from users of the plurality of users.

16. The non-transitory computer-readable storage medium of claim 15, wherein the unique identifier is a combination of values of the first advertising component and the at least one second advertisement component.

17. The non-transitory computer-readable storage medium of claim 15, wherein the instructions that, when executed by the processor, further cause the processor to:
for the unique combination of the plurality of different possible advertisement components previously communicated in the advertisement to a user of the plurality of users:
receive a plurality of comments to the unique combination for advertisement, the plurality of comments being submitted by one or more users to whom the advertisement with the unique combination was communicated; and
associate the plurality of comments with the unique identifier for the corresponding unique combination.

18. The non-transitory computer-readable storage medium of claim 17, wherein the instructions that, when executed by the processor, further cause the processor to:

identify an additional user of the plurality of users of the online system to be presented with a unique combination previously communicated in the advertisement; and transmit, to the additional user of the online system, the unique combination previously communicated in the advertisement, the unique combination of previously communicated in the advertisement including at least one comment of the plurality of received comments associated with the unique combination previously communicated in the advertisement via the unique identifier for the unique combination previously communicated in the advertisement, and the at least one comment including an identification of the user that performed the at least one comment.

19. The non-transitory computer-readable storage medium of claim 18, wherein the instructions that, when executed by the processor, further cause the processor to:

receive an interaction with the advertisement from the additional user; and associate the received interaction from the additional user with the unique identifier for the unique combination.

20. The non-transitory computer-readable storage medium of claim 10, wherein the instructions that, when executed by the processor, further cause the processor to generate another personalized feed for presentation to another user.

* * * * *